United States Patent
Guettle et al.

[11] Patent Number: 5,924,411
[45] Date of Patent: Jul. 20, 1999

[54] METHOD FOR OPERATING AN INTERNAL COMBUSTION ENGINE, AND AN INTERNAL COMBUSTION ENGINE

[75] Inventors: Herbert Guettle, Elchingen; Martin Hartweg, Erbach; Eberhard Holder, Kusterdingen; Herbert Klein, Leutenbach, all of Germany

[73] Assignee: Daimler-Benz Aktiengesellschaft, Germany

[21] Appl. No.: 08/933,933

[22] Filed: Sep. 19, 1997

[30] Foreign Application Priority Data

Sep. 19, 1996 [DE] Germany .................... 196 38 323

[51] Int. Cl.⁶ .................................................. F02M 31/16
[52] U.S. Cl. ............................................................ 123/549
[58] Field of Search .............................. 123/549, 179.21, 123/536, 537, 538, 557

[56] References Cited

U.S. PATENT DOCUMENTS

| | | | |
|---|---|---|---|
| 3,777,728 | 12/1973 | Reiche ..................... | 123/549 |
| 3,892,215 | 7/1975 | Hickling et al. . | |
| 3,930,477 | 1/1976 | Jordan . | |
| 4,378,001 | 3/1983 | Takeda et al. ............ | 123/549 |
| 4,866,250 | 9/1989 | Pasbrig ..................... | 123/549 |
| 4,967,706 | 11/1990 | Van Wechem et al. ....... | 123/549 |
| 5,111,797 | 5/1992 | Shikanai . | |
| 5,154,154 | 10/1992 | Henke et al. . | |
| 5,172,673 | 12/1992 | Pelgrim et al. ............ | 123/549 |
| 5,297,530 | 3/1994 | Kaneko et al. . | |
| 5,297,531 | 3/1994 | Akase ....................... | 123/549 |

FOREIGN PATENT DOCUMENTS

| | | |
|---|---|---|
| 0 709 566 A2 | of 0000 | European Pat. Off. . |
| 35 02 767 A1 | of 0000 | Germany . |
| 40 24 005 A1 | of 0000 | Germany . |
| 8-014123 | of 0000 | Japan . |
| 02238212 | 9/1990 | Japan . |
| 03064659 | 3/1991 | Japan . |
| 05026013 | 2/1993 | Japan . |
| 07097964 | 4/1995 | Japan . |
| WO 92/09802 | of 0000 | WIPO . |

OTHER PUBLICATIONS

"Light Emitting Diode Fuel Conditioning", Research Disclosure, No. 335, Emsworth, BG, March 1992, p. 193.

*Primary Examiner*—Marguerite McMahon
*Attorney, Agent, or Firm*—Evenson, McKeown, Edwards & Lenahan, P.L.L.C.

[57] ABSTRACT

A method operates an improved internal combustion engine by heating the fuel before entry into the cylinder, at least during the cold-start phase of the engine. In order to undertake the heating step in a favorable way, at least areas in the region of an intake valve are irradiated with an electromagnetic radiation of radiation source, and thereby heated without contact. As a result, liquid fuel in the valve region is heated by contact with the areas of the valve region, and condensation of the fuel is at least reduced.

27 Claims, 1 Drawing Sheet

5,924,411

METHOD FOR OPERATING AN INTERNAL COMBUSTION ENGINE, AND AN INTERNAL COMBUSTION ENGINE

BACKGROUND AND SUMMARY OF THE INVENTION

This application claims the priority of German application 196 38 323.4, the disclosure of which is expressly incorporated by reference herein.

The present invention relates to an improved method for operating an internal combustion engine the fuel is introduced into an intake port of the internal combustion engine and is heated in the region of the intake port at least during the cold-start phase of the engine before its entry into the cylinder. Furthermore, the present invention relates to an improved internal combustion engine having an intake port for feeding fuel to an injection valve of a cylinder, an injection nozzle which ejects the fuel, and a heat source which at least indirectly heats the fuel located in the intake port.

DE 40 24 005 A1 discloses an internal combustion engine having an intake port in which a heat source of plate-shaped configuration is arranged between an injection nozzle and an intake valve. The fuel coming from the injection nozzle strikes the heat source which is inclined transversely to the injection direction. As a result, the fuel is heated and vaporized. The heating of the fuel results in better preparation of the air-fuel mixture, thus reducing the pollutants in the exhaust gas during the cold-start phase. In the process, however, fuel condenses on the cold spots in the intake port, and thereby, in particular, in the region around the intake valve (the valve itself being included in the valve region and referred to throughout as the valve region for simplicity) as well as on the remaining walls of the intake port. This condensation has a negative effect on the pollutant emission.

U.S. Pat. No. 5,297,530 discloses a heating element mounted in a region between an intake valve and an injection nozzle. The fuel jet coming from the injection nozzle and injected into an intake port of a cylinder passes the heating element, just like parts of the inflowing fresh air, with consequent heating of the air-fuel mixture. Here, as well, the heating operation results in better preparation of the mixture, and as a result the pollutants in the cold-start phase are reduced. Despite the relatively high structural outlay for the heating element, however, fuel still condenses on the walls of the intake tract with this known configuration.

An object of the present invention is to improve the method for operating an internal combustion engine so that, in conjunction with a low structural outlay, the characteristics of internal combustion engines are improved in the cold-start phase, and thereby, particularly, the pollutant emission is improved.

Furthermore, it is another object of the present invention to prove a basic internal combustion engine for the aforementioned purpose.

These objects have been achieved in a method in which at least areas of the walls of the intake port are irradiated by an electromagnetic radiation and heated without contact in the region of an intake valve, and in which liquid fuel is at least partially vaporized in the valve region by contact with the valve region.

An improved basic internal combustion engine is achieved by providing a heat source which is a radiation source having electromagnetic radiation wavelength within the absorption spectrum of the fuel and/or of the material present in the region of the intake valve (termed valve region below for simplicity) and/or of the material of the walls of the intake port, and in that the radiation is aimed at least indirectly at at least the valve region.

Irradiating the air-fuel mixture and/or the inner wall of the intake port with a radiation source which is easy to introduce results, during cold starting, in favorable heating, the fuel located there. A particular advantage of the present invention results from the use of radiation to heat at least the walls in the valve region, because then no fuel, or only a slight amount of fuel, can condense in this region on the cold areas of the intake tract.

Preventing condensation of the fuel a particularly favorable recognition by way of injection nozzles which preheat the fuel and thereby, in particular, vaporize the fuel is also a particularly favorable contribution and recognition of the present invention. The at least slight condensation of fuel on the walls of the intake port results, for example, in reduction of the mixture enrichment of the air-fuel mixture in the cold-start phase. In the best case, fuel enrichment, which relates to the condensation effect, can be dispensed with entirely.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
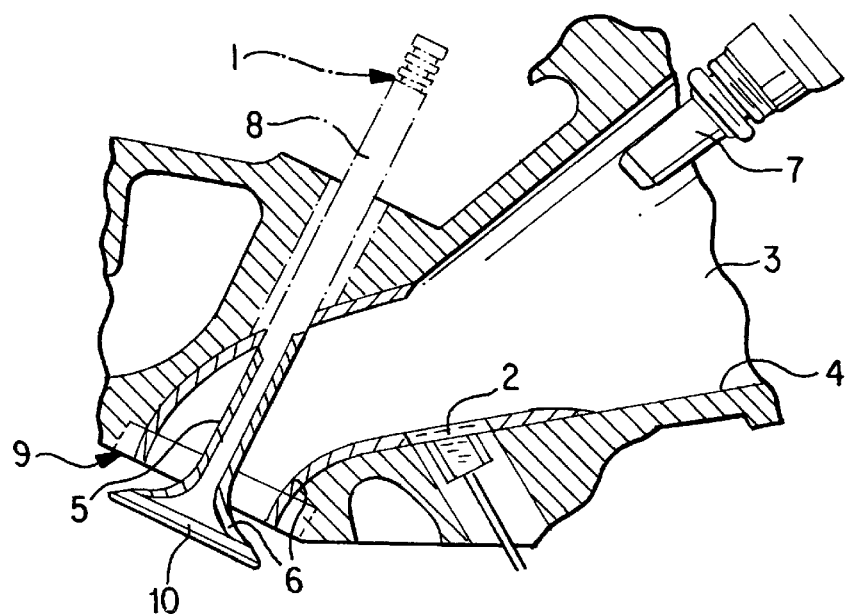
FIG. 1 is a cross-sectional view of an internal combustion engine in a region of the intake port.

In the region of the intake port 3 shown in FIG. 1, the internal combustion engine is provided with an injection nozzle 7 for the fuel. The fuel is injected through the nozzle 7 into the intake port 3 in the direction of the valve seat 9 of the intake valve 1.

A tungsten halogen lamp acts as a radiation source 2 and is arranged exchangeably (i.e., interchangeably) in a recess which is introduced between the injection nozzle and the intake valve. Of course, the present invention contemplates a plurality of radiation sources instead of one radiation source 2.

The walls 4 of the intake port 3 are advantageously coated between the injection nozzle 7 and the intake valve 1 with a heat-storing layer 6, e.g. a ceramic blackened on the inside. Likewise, the surface 5 of the valve head 10 which is on the intake-port side, and of the valve shaft 8 projecting into the intake port 3 is coated with the heat-storing layer 6.

The radiation characteristic of the radiation source 2, and the material of the heat-storing layer 6 are in this embodiment matched to one another such that the energy of the radiation striking the heat-producing layer 6 is at least largely absorbed by the heat-storing layer 6 which is thus heated.

The radiation is aimed at least on the areas around the valve seat 9 and the surface 5 of the intake valve 1 on the intake port-side. Such illumination can be implemented, for example, by a suitable optical system of known configuration, e.g. lenses and mirror systems.

A currently preferred installation site for the radiation source 2 is on the side of the intake port 3 opposite the injection nozzle 7, because it can be installed here at least simply and inexpensively. Furthermore, a majority of the fuel condenses on the surface of the intake port 3 which is on the injection-nozzle side and is then irradiated directly by the radiation source 2.

It is particularly advantageous for the material of the heat-storing layer 6 or the material of the intake port 3 to which radiation is applied, specifically the material of the valve region, to be matched with regard to its specific thermal capacity and thermal conductivity to the period of the absorption response, and the wavelength and the intensity of the radiation such that (a) the heating time of the heat-storing layer 6 to a temperature which is greater than or equal to the boiling point of the fuel is less than 10 s, more particularly less than 5 s;

(b) the energy required to heat the heat-storing layer 6 is as low as possible;

(c) the surface temperature of the heat-storing layer 6 remains below the self-ignition temperature of the fuel;

(d) the absorption of the radiative energy of the heat-storing layer 6 is as high as possible; and (e) the cooling of the intake region (intake port and intake tube) is not impermissibly obstructed during the heating operation.

The radiation source 2 is switched on at or shortly before the internal combustion engine is put into operation, i.e. at the latest when the engine is started and the fuel injection is thereby initiated. Radiation is preferably applied to the walls 4 of the intake port 3 between the injection nozzle 7 and the intake valve 1. The radiation of the radiation source 2 is at least partially absorbed by the heat-storing layer 6 preferably arranged in these regions, as a result of which the heat-storing layer 6 is heated.

Because the heating of at least the valve region and, advantageously, also of at least a few of the remaining surface regions of the intake port 3 to temperatures above the final boiling point of the fuel requires a certain amount of time, the radiation source 2 is activated before the first operation of injecting the fuel into the intake port 3. This can be done, for example, by switching on the radiation source 2 upon opening a vehicle door. In order to prevent overheating, the radiation source 2 is configured to be operated only for a prescribable time. For example, an electronic logic system can detect the temperature of the wall (with or without the heat-storing layer 6) for this purpose and, if appropriate, intervene to exert control.

The radiation source 2 can be put into operation in a manner similar to the preheating of a diesel engine, performed in a few seconds, in particular 10 to 30 seconds, before the internal combustion engine is put into operation.

The illumination heats at least the valve region. Advantageously, the heating is selected so that after a specific run-up time at least less, preferably only a negligible quantity of up to no further fuel condenses on the walls 3, i.e., in particular, on the heat-storing layer 6. For this purpose, at least the valve region should be at least at the final boiling point of the fuel at or shortly after starting the engine. This is achieved by, among other things, appropriately matching to one another the material-specific characteristics (specific thermal conductivity, specific thermal capacity, depth of heat penetration, absorption coefficient etc.) and the parameters of the halogen lamp (intensity, wavelength, period of irradiation, continuous or pulsed operation etc.).

The irradiation of the walls 3 should be performed for the period of the first 60 to 90 seconds, for which reason the radiation source 2 is sensibly also operated only during this time, but also at the latest after this period the heating is performed satisfactorily from the engine and a known catalytic converter arranged on the exhaust-gas side is deployed automatically.

Although the illustrated embodiment shows a suction engine having a single intake valve 1, the present invention can also be applied directly to engines having at least two intake valves 1, or also to engines which are charged, for example, by a compressor.

Figure 2:
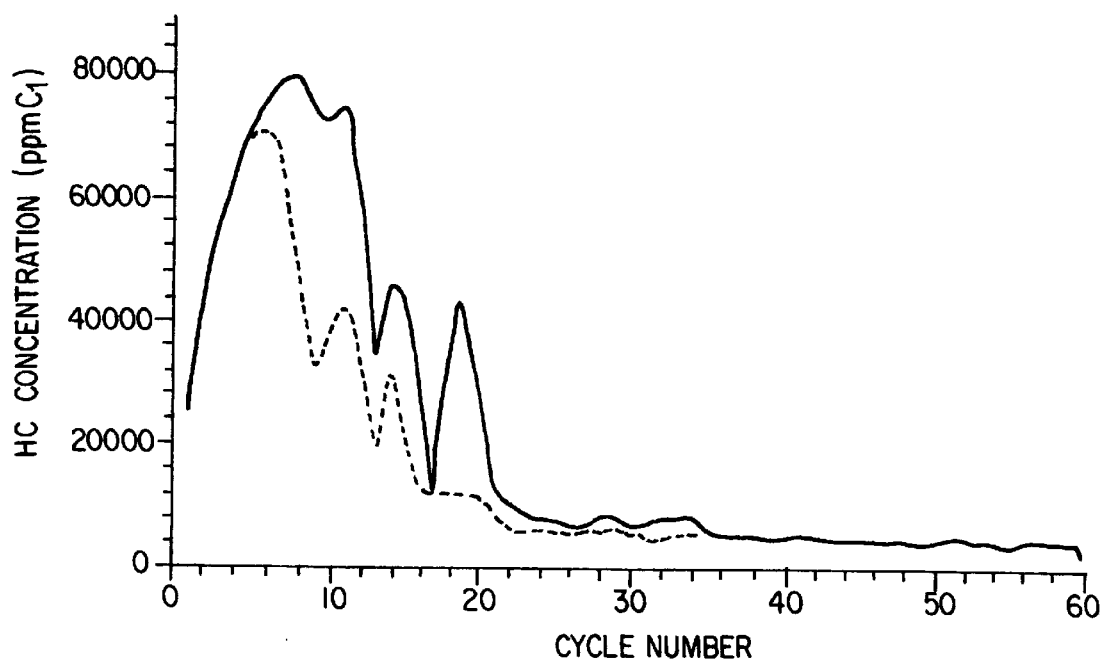
FIG. 2 is a diagram of the ejection of hydrocarbons during cold starting.

A diagram in which the emission of hydrocarbons after a cold start is plotted against the cycle number of an internal combustion engine is represented in FIG. 2. The diagram represents, on one hand, the characteristic of the hydrocarbons emission (HC emission) without irradiation (continuous line) and with irradiation for one minute (dotted line).

In order to emphasize the advantageousness of the invention, the experiment was carried out with a commercially available engine, in which neither the valve region nor the remaining walls 4 of the intake port 3 were provided with a heat-storing layer 6 which raises the efficiency of the radiation heating according to the invention. An arbitrary halogen lamp was also used, so that, among other things, in this experiment the lamp geometry, the installation site of the lamp and its radiation characteristic were also not optimum.

The diagram according to FIG. 2 was recorded at 1500 revolutions per minute, a pressure of 0.4 bars and a cold-start temperature of 20° C. The halogen lamp switched on with the injection of the fuel had its radiation maximum in the visible spectral region, i.e. below a wavelength of 1000 nm. The decrease in the HC values with the aid, according to the present invention, of the halogen lamp was, notwithstanding unfavorable uncoated walls 4, occurred approximately 4 to 10 cycles earlier than with an unilluminated valve region as seen in the diagram. Overall, in this example the influence of the heating by radiation or lamp on the HC emission attenuates or dies away after approximately 40 cycles.

Furthermore, FIG. 2 also shows that, for the purpose of better reducing the HC emission at the start of operation of the internal combustion engine, the start of irradiating the walls 4 should occur at least 0.2 s to 2 s before the first injection of fuel, and this corresponds in the experiment to a period of approximately 4 to 40 cycles. Because the experiment employed walls 4 which were also still heated by the combustion of the air-fuel mixture, this start time is correspondingly lengthened in preheating before starting the engine.

The heating of the walls 4 of the intake port 3 can advantageously be supported by providing the surfaces of the valve region and/or the walls 4 of the intake port 3 with a PTC heating layer which can be heated by electrical resistance.

In order, in particular, to economize on installation space, costs and energy (for heating), the heating layer can advantageously be constructed simultaneously as a heat-storing layer 6. The entire heat-storing layer 6 need not, however, be constructed simultaneously as a heating layer. Thus, in particular, the regions of the intake valve 1 with which it is difficult to make contact can be excluded.

The heating layer can also advantageously have an electrically conducting contact with and surround the metallic material of the intake tract of the internal combustion engine. Thereby, contact can be made in a simple way with the negative pole of a battery of, e.g., a motor vehicle.

A heat-storing layer 6 which is simultaneously constructed as a PTC heating layer is heated by applying an electric voltage to the PTC heating layer. The energy required to heat the thermally conductive/heating layer 6 is relatively low, because this heating layer is, of course, also further heated by the radiation of the radiation source 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for operating an internal combustion engine, comprising the steps of introducing liquid fuel into an intake port of the internal combustion engine, and heating the fuel in a region of the intake port at least during the cold-start phase of the engine before its entry into the cylinder, wherein the step of heating includes irradiating and heating at least areas of walls of the intake port by electromagnetic radiation absorption without contact in a valve region, and vaporizing the liquid fuel at least partially in the valve region by contact with the valve region.

2. The method according to claim 1, wherein at least one radiation maximum of a source of the electromagnetic radiation has a wavelength below 4 $\mu$m.

3. The method according to claim 2, wherein the wavelength is below 2 $\mu$m.

4. The method according to claim 2, wherein the wavelength is below 1000 nm.

5. The method according to claim 1, wherein at least subregions of the walls of the intake port are irradiated outside the valve region and are heated by the electromagnetic radiation.

6. The method according to claim 1, wherein the irradiation and thereby heating of at least the valve region occurs until automatic deployment of an exhaust-gas side catalytic converter.

7. The method according to claim 1, wherein surface material of at least the valve region is heated to at least the final boiling point of the fuel.

8. The method according to claim 1, wherein a radiation source emitting the electromagnetic radiation is operated after starting of the internal combustion engine for at most 90 s.

9. The method according to claim 8, wherein the radiation source is operated for at most 60 s.

10. The method according to claim 1, wherein at least 60% of the walls intensely wetted by fuel is heated.

11. The method according to claim 10, wherein 90% of the walls is heated.

12. An internal combustion engine, comprising a cylinder having an injection valve, an intake port for feeding fuel to the injection valve, an injection nozzle configured to eject the fuel, and a heat source which at least indirectly heats the fuel located in the intake port, wherein the heat source comprises a radiation source which emits electromagnetic radiation in a wavelength which matches an absorption spectrum of at least one of the fuel, a material in a region of the intake valve and material of a wall of the intake port, and in a direction aimed at least indirectly at the intake valve region.

13. The internal combustion engine according to claim 12, wherein the radiation source is configured to have at least one radiation maximum below 4 $\mu$m.

14. The engine according to claim 13, wherein the radiation maximum is below 2 $\mu$m.

15. The engine according to claim 13, wherein the radiation maximum is below 1000 nm.

16. The engine according to claim 12, wherein the radiation source is configured to aim the radiation at least indirectly at at least subregions of the walls of the intake port.

17. The engine according to claim 12, wherein the radiation source is configured to aim the radiation at least at surfaces arranged around a valve seat of the intake valve.

18. The engine according to claim 12, wherein the radiation source is a lamp.

19. The engine according to claim 12, wherein the radiation source is a halogen lamp.

20. The engine according to claim 12, wherein the radiation source is a tungsten halogen lamp.

21. The engine according to claim 12, wherein at least one of an intake-port side surface of the intake valve and the wall of the intake port is coated with a heat-storing layer to absorb at least part of the radiation in at least the intake valve region.

22. The engine according to claim 12, wherein the radiation source illuminates at least 60% of areas intensely wetted by the fuel.

23. The engine according to claim 12, wherein the radiation source illuminates 90% of areas intensely wetted by the fuel.

24. The engine according to claim 12, wherein at least one of surfaces of the valve region and the wall of the intake port has a heating layer configured to be heated by electrical resistance.

25. The engine according to claim 24, wherein the heating layer is a PTC heating layer.

26. The engine according to claim 21, wherein the heat-storing layer is configured as a heating layer.

27. The engine according to claim 24, wherein the heating layer is a heat-storing layer.

* * * * *